US012646218B2

(12) United States Patent
Voss-Wolff et al.

(10) Patent No.: US 12,646,218 B2
(45) Date of Patent: Jun. 2, 2026

(54) REMOTE DEPTH BUFFER COMPRESSION

(71) Applicant: Microsoft Technology Licensing, LLC, Redmond, WA (US)

(72) Inventors: Christian Voss-Wolff, Herzberg am Harz (DE); Norbert Clemens Kern, Kirchberg an der Murr (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 18/617,616

(22) Filed: Mar. 26, 2024

(65) Prior Publication Data

US 2025/0308073 A1     Oct. 2, 2025

(51) Int. Cl.
*G06T 9/00* (2006.01)

(52) U.S. Cl.
CPC ..................................... *G06T 9/00* (2013.01)

(58) Field of Classification Search
None
See application file for complete search history.

(56) References Cited

U.S. PATENT DOCUMENTS 6,411,295 B1 6/2002 Hung et al.
2023/0328216 A1* 10/2023 Khani .................... H04N 19/85

FOREIGN PATENT DOCUMENTS

WO     WO 2023/195720     10/2023

OTHER PUBLICATIONS

International Search Report and Written Opinion dated Apr. 28, 2025, from International Patent Application No. PCT/US2025/015634, 15 pp.
Siekkinen et al., "Neural Network Assisted Depth Map Packing for Compression Using Standard Hardware Video Codecs," arXiv:2206.15183v1, 16 pp. (Jun. 2022).

* cited by examiner

*Primary Examiner* — Yi Wang
(74) *Attorney, Agent, or Firm* — Klarquist Sparkman, LLP

(57) ABSTRACT

A high dynamic range (HDR) depth buffer is received at a remote computer. The HDR depth buffer is formed into a plurality of tiles. For each tile, a respective maximum and minimum value of the HDR depth buffer in a region greater than a width of the respective tile is determined. An initial pair of piecewise bilinear bounding functions for the HDR depth buffer is determined using the determined maximum and minimum depth values. For each tile, the initial pair of piecewise bilinear bounding functions is iteratively adjusted to move the respective minimum and maximum depth value of each tile closer to the HDR depth buffer, wherein no adjacent tile is adjusted in the same iteration. Using the adjusted pair of piecewise bilinear bounding functions, a low dynamic range (LDR) depth buffer and tile data are generated and encoded using a video encoder and a lossless compressor respectively.

20 Claims, 12 Drawing Sheets

200

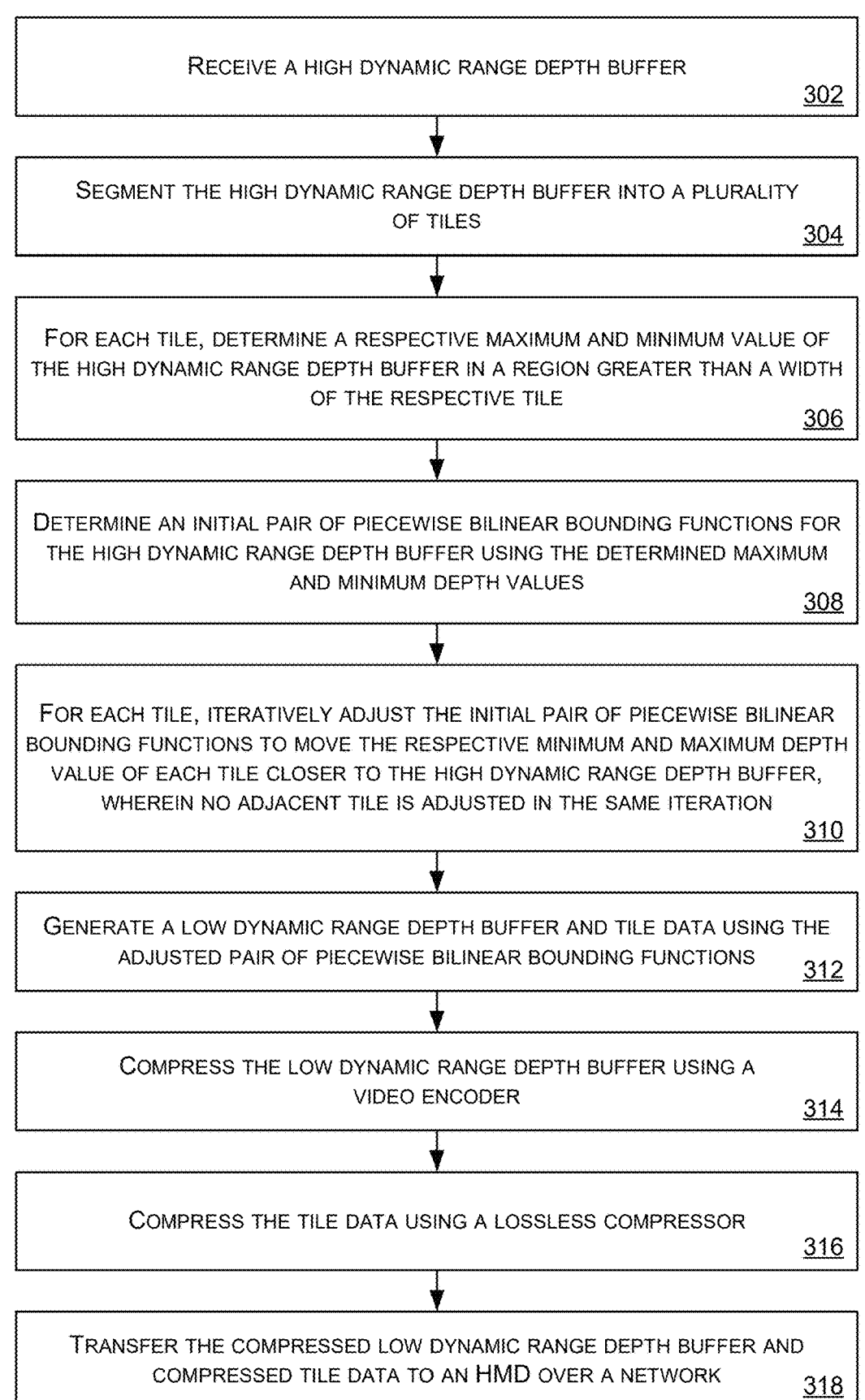

RECEIVE A HIGH DYNAMIC RANGE DEPTH BUFFER
302

SEGMENT THE HIGH DYNAMIC RANGE DEPTH BUFFER INTO A PLURALITY OF TILES
304

FOR EACH TILE, DETERMINE A RESPECTIVE MAXIMUM AND MINIMUM VALUE OF THE HIGH DYNAMIC RANGE DEPTH BUFFER IN A REGION GREATER THAN A WIDTH OF THE RESPECTIVE TILE
306

DETERMINE AN INITIAL PAIR OF PIECEWISE BILINEAR BOUNDING FUNCTIONS FOR THE HIGH DYNAMIC RANGE DEPTH BUFFER USING THE DETERMINED MAXIMUM AND MINIMUM DEPTH VALUES
308

FOR EACH TILE, ITERATIVELY ADJUST THE INITIAL PAIR OF PIECEWISE BILINEAR BOUNDING FUNCTIONS TO MOVE THE RESPECTIVE MINIMUM AND MAXIMUM DEPTH VALUE OF EACH TILE CLOSER TO THE HIGH DYNAMIC RANGE DEPTH BUFFER, WHEREIN NO ADJACENT TILE IS ADJUSTED IN THE SAME ITERATION
310

GENERATE A LOW DYNAMIC RANGE DEPTH BUFFER AND TILE DATA USING THE ADJUSTED PAIR OF PIECEWISE BILINEAR BOUNDING FUNCTIONS
312

COMPRESS THE LOW DYNAMIC RANGE DEPTH BUFFER USING A VIDEO ENCODER
314

COMPRESS THE TILE DATA USING A LOSSLESS COMPRESSOR
316

TRANSFER THE COMPRESSED LOW DYNAMIC RANGE DEPTH BUFFER AND COMPRESSED TILE DATA TO AN HMD OVER A NETWORK
318

| | | | | | |
|---|---|---|---|---|---|
| PASS 1 | PASS 2 | PASS 1 | PASS 2 | PASS 1 | PASS 2 |
| PASS 3 | PASS 4 | PASS 3 | PASS 4 | PASS 3 | PASS 4 |
| PASS 1 | PASS 2 | PASS 1 | PASS 2 | PASS 1 | PASS 2 |
| PASS 3 | PASS 4 | PASS 3 | PASS 4 | PASS 3 | PASS 4 |
| PASS 1 | PASS 2 | PASS 1 | PASS 2 | PASS 1 | PASS 2 |
| PASS 3 | PASS 4 | PASS 3 | PASS 4 | PASS 3 | PASS 4 |

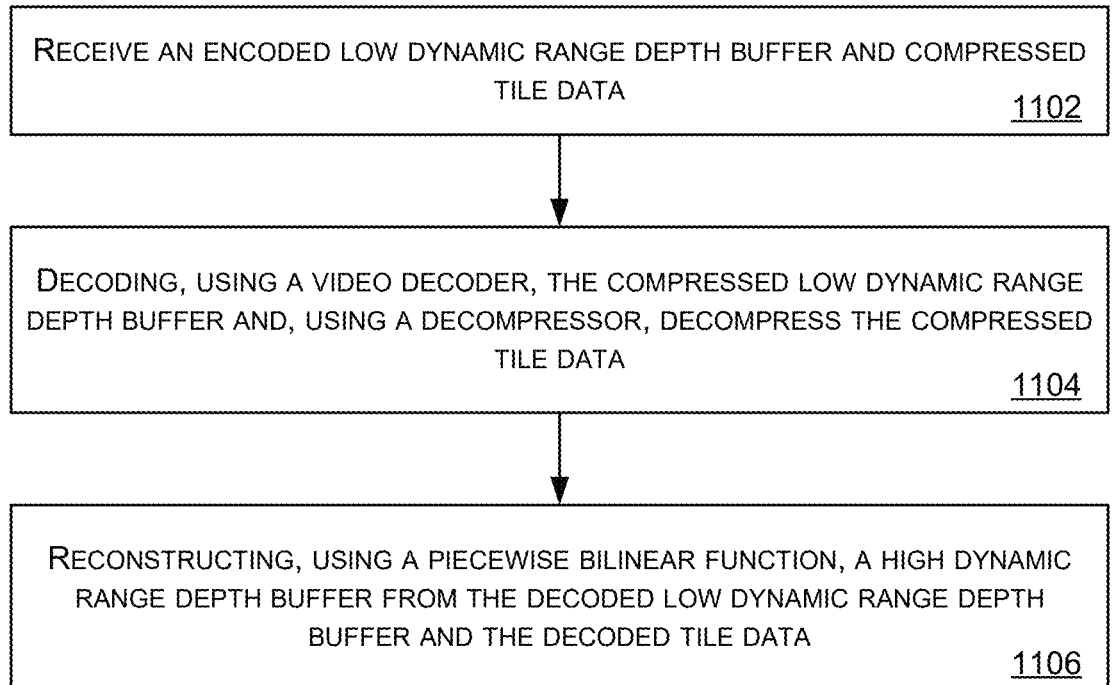

RECEIVE AN ENCODED LOW DYNAMIC RANGE DEPTH BUFFER AND COMPRESSED TILE DATA

1102

DECODING, USING A VIDEO DECODER, THE COMPRESSED LOW DYNAMIC RANGE DEPTH BUFFER AND, USING A DECOMPRESSOR, DECOMPRESS THE COMPRESSED TILE DATA

1104

RECONSTRUCTING, USING A PIECEWISE BILINEAR FUNCTION, A HIGH DYNAMIC RANGE DEPTH BUFFER FROM THE DECODED LOW DYNAMIC RANGE DEPTH BUFFER AND THE DECODED TILE DATA

REMOTE DEPTH BUFFER COMPRESSION

BACKGROUND

Mixed-reality (MR) systems and devices include virtual-reality (VR) and augmented-reality (AR) systems. Conventional VR systems create completely immersive experiences by restricting users' views to only virtual images rendered in VR scenes/environments. Conventional AR systems create AR experiences by visually presenting virtual images that are placed in, or interact with, the real world. As used herein, VR and AR systems are described and referenced interchangeably via use of the phrase "MR system". Also, as used here, the terms "virtual image", "virtual content", "colour image" and "hologram" refer to any type of digital image rendered by an MR system. Furthermore, it should be noted that a head-mounted device (HMD) typically provides the display used by a user to view and/or interact with holograms provided within an MR scene/environment.

Where a hologram is initially generated or prepared at a remote system (e.g., at a remote cloud service having a specialised graphics processing unit (GPU)) and then transmitted over a network to the HMD, remote rendering is typically performed. As used herein, a remote computer or remote system comprises a computer or system which is separate from the HMD, such as by being proximal to the HMD or located in the cloud. Remote rendering is beneficial because it helps to reduce the amount of processing performed locally on the HMD.

In remote rendering, a computer or cloud server produces a colour and depth image, which are transmitted over a network to a head-mounted device (HMD). Depth images are often used for positional correction of colour images, also known as late stage reprojection, as well as composition with local content. This makes the transmission of depth images at sufficiently high accuracy an important aspect of remote rendering.

The embodiments described below are not limited to implementations which solve any or all of the disadvantages of environments such as those described above. Rather, this background is only provided to illustrate one exemplary technology area where some embodiments described herein may be practised.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Examples disclosed herein operate to improve the accuracy of depth images transmitted between a remote rendering device and an HMD. By following the disclosed principles, substantial benefits, advantages and computing efficiencies may be achieved, thereby improving the performance of the computing architecture and the user's experience with the HMD.

In some examples, a high dynamic range (HDR) depth buffer is received at a remote computer. The HDR depth buffer is decomposed into a low dynamic range (LDR) depth buffer and tile data. Decomposing the HDR depth buffer comprises: segmenting the HDR depth buffer into a plurality of tiles. For each of the plurality of tiles, a respective maximum and minimum value of the HDR depth buffer in a region greater than a width of the respective tile is determined. An initial pair of piecewise bilinear bounding functions for the high dynamic range depth buffer is determined using the determined maximum and minimum depth values of the high dynamic range depth buffer in the region greater than the width of the respective tile. For each tile, the initial pair of piecewise bilinear bounding functions is iteratively adjusted to move the respective minimum and maximum depth value of each tile closer to the HDR depth buffer, wherein no adjacent tile is adjusted in the same iteration. Using the adjusted pair of piecewise bilinear bounding functions, a low dynamic range depth buffer and tile data are generated. The generated LDR depth buffer is encoded using a video encoder and the tile data is compressed using a lossless compressor. The encoded LDR depth buffer and the compressed tile data are transferred to a head-mounted device (HMD) over a data network.

In some embodiments, a head-mounted device (HMD) receives an encoded low dynamic range (LDR) depth buffer and compressed tile data. The compressed LDR depth buffer is decoded using a video decoder and the compressed tile data is decompressed using a decompressor. Using a piecewise bilinear interpolation function, a HDR depth buffer is reconstructed from the decoded LDR depth buffer and the decoded tile data.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 3 illustrates a flow diagram of an example technique for remote rendering of depth images;

FIG. 6 illustrates an example method for generating bounding functions for a depth image according to the present technology;

FIG. 11 illustrates a flow diagram of an example technique for reconstruction of depth images on an HMD.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

In remote rendering scenarios, a powerful computer or cloud server produces a colour and depth image, which are transmitted over a network to a HMD. A depth image comprises, for every pixel, a value indicating how far away a surface in the world depicted by the pixel is from the camera. Depth images may be used for many purposes, such as positional correction of the corresponding coloured image (late-stage reprojection), as well as composition with local content, making transmission at a sufficiently high accuracy of great importance. Thus, to ensure the quality of late-stage reprojection and/or of composition is sufficient, it is important that the depth image be transmitted over a network at a high quality.

Regarding colour images, commercial video encoders are able to easily encode colour images at sufficiently high quality. Existing video codec hardware, for example, that implements H.264, H.265 or AV1, is very suitable for compressing low dynamic range (LDR) colour images at low latencies to reduce network bandwidth requirements.

Video codec hardware typically supports dynamic ranges of 8 bits per pixel, or 10-12 bits per pixel when high dynamic range (HDR) support is available. However, depth images typically have a dynamic range of 16, 24 or 32 bits per pixel. This makes it impossible to directly encode a depth image using a standard video codec. Therefore, to transmit depth images over a network, additional processing may be performed to reduce the HDR image to a LDR image which is able to be transmitted over a network with minimal loss. However, existing approaches of processing the HDR depth image prior to encoding can introduce discontinuities in the LDR depth image which in turn introduces spurious high frequency components into the LDR depth image sent to the video encoder.

Resolving the discontinuities introduced into the LDR depth image requires additional processing to encode and adds significant latency to the transmission of depth images to an HMD. Consequently, reducing the amount of depth discontinuities in the depth image whilst preserving depth quality provides numerous benefits.

Figure 1:
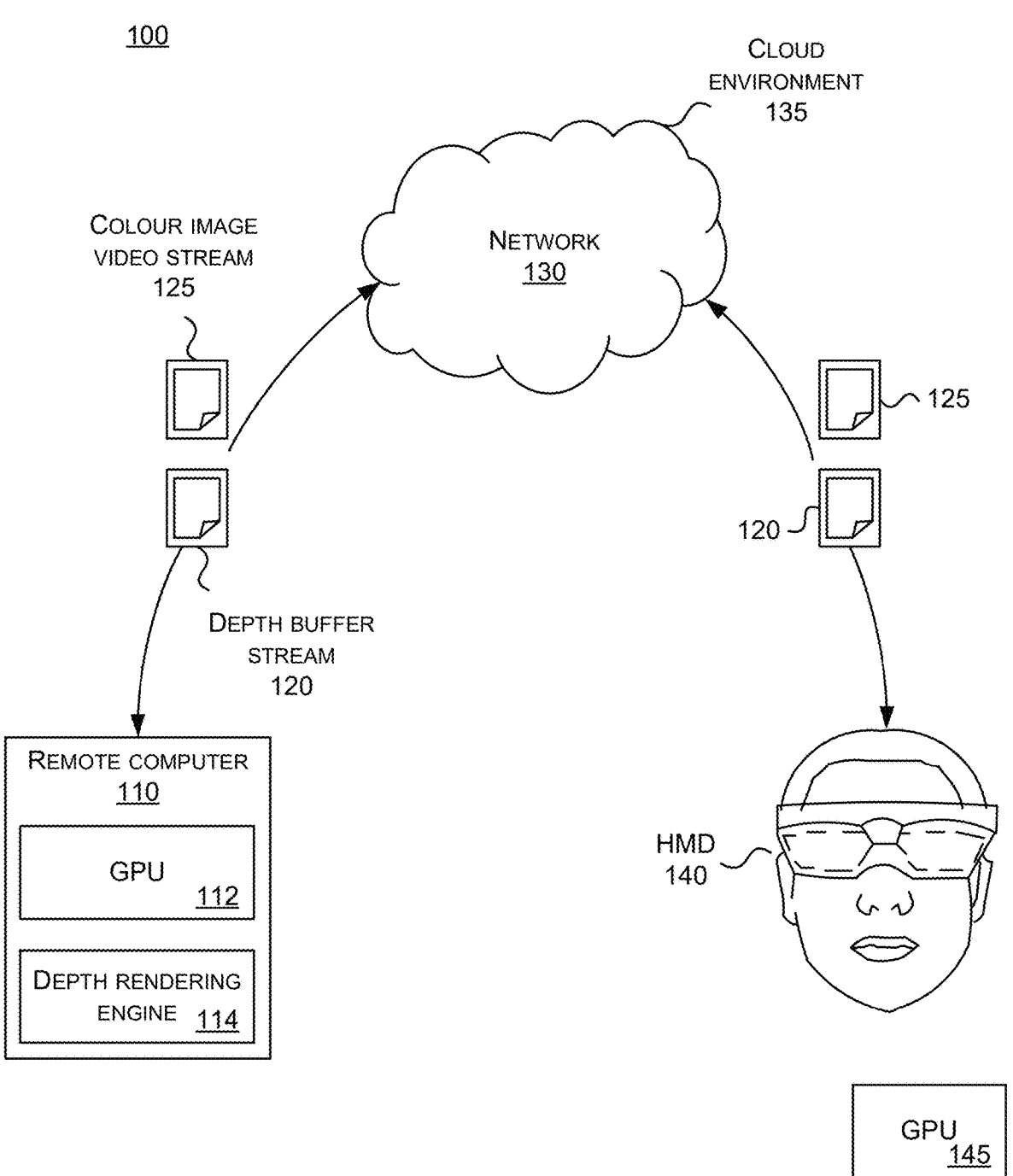
FIG. 1 illustrates an example architecture to perform remote rendering.

FIG. 1 illustrates an example architecture 100 for performing remote rendering. As shown in FIG. 1, architecture 100 includes a scenario involving a head-mounted device (HMD) 140. The HMD includes hardware, such as graphics processing unit (GPU) 145. Architecture 100 also includes a remote computer 110 which comprises hardware such as GPU 112 and depth rendering engine 114. The remote computer 110 processes a HDR depth image into a LDR depth image which is sent as part of depth buffer stream 120 via network 130 to the HMD 140. The remote computer may also send a colour image video stream 125 over the network 130 to the HMD 140. The network 130 and/or the remote computer 110 may operate in a cloud environment 135.

In various examples, functionality in the remote computer is able to determine a pair of piecewise bilinear bounding functions, using a heuristic process for solving millions of inequalities in real time. A pair of piecewise bilinear bounding functions is determined in approximately a millisecond, rather than several seconds, thereby significantly reducing delays in transmission of HDR depth images. Moreover, the determined pair of piecewise bilinear bounding functions fit tightly around a HDR depth buffer, thereby reducing the overall quantisation error. The determined functions are additionally determined with minimal computation and are easily encodable (e.g. via the tile data) and transmittable with a small amount of bandwidth.

As the bounding functions of the present technology fit tightly around the HDR depth values, overall quantisation error is reduced. Moreover, owing to the tight fit of the piecewise bilinear bounding functions and the lack of discontinuities of tiles in an LDR depth buffer, reconstruction of the HDR depth image is performed on the HMD with a minimal amount of computation.

Figure 2:
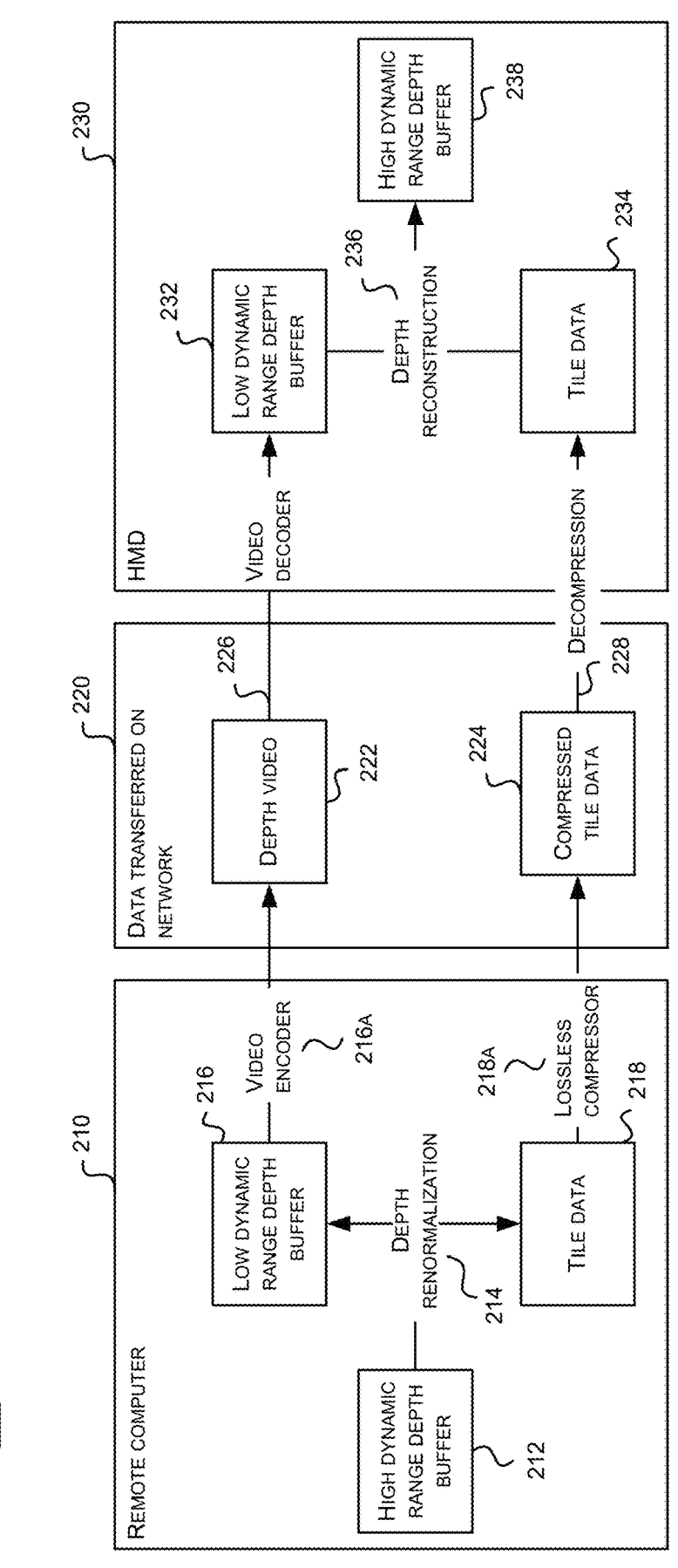
FIG. 2 illustrates an example architecture to perform remote rendering.

FIG. 2 illustrates an example system 200 for performing remote rendering. The example system 200 includes a remote computer 210, a network 220 and an HMD 230. In some cases, the remote computer 210 is a server or compute node in a data centre. At the remote computer 210, a high dynamic range (HDR) depth buffer 212 is received (such as from a renderer which rendered the depth buffer from a 3D model). As used herein, the terms depth buffer and depth image may be used interchangeably. Depth normalisation 214 is performed on the HDR depth buffer 212 to obtain low dynamic range (LDR) depth buffer 216 and tile data 218. In some examples, the tile data 218 comprises metadata regarding the normalisation 214 of the HDR depth buffer 212. The LDR depth buffer 216 is compressed, using video encoder 216a to obtain depth video 222 and transferred on network 220 to the HMD 230. The tile data 218 is compressed, using lossless compressor 218a and the compressed tile data 224 is sent over the network 220 to the HMD 230.

At the HMD 230, a video decoder 226 is used to decode the compressed LDR depth buffer 222 into LDR depth buffer 232. Also at the HMD 230, a decompressor 228 is used to decompress the compressed tile data 224 to tile data 234. The LDR depth buffer 232 and tile data 234 are reconstructed 236 to obtain the HDR depth buffer 238 at the HMD.

FIG. 3 shows an exemplary method performed at a remote server or remote computer, such as remote computer 210. As depicted in FIG. 2, the remote computer receives 302 a HDR depth buffer such as from a video game, from a renderer which rendered the depth buffer from a 3D model, or from a memory storing the HDR depth buffer. To perform the depth renormalisation, the HDR depth buffer is segmented 304 into a plurality of tiles. The HDR depth buffer may be segmented in numerous ways. For example, an HDR depth buffer may be segmented into N×N square tiles of predetermined size. However, the tiles need not be square. In an example, the tiles are rectangular.

For each tile in the plurality of tiles, a respective maximum and minimum value of the HDR depth buffer in a region greater than a width of the respective tile is determined 306. An initial pair of piecewise bilinear bounding functions for the HDR depth buffer are determined 308 using the determined maximum and minimum depth values.

For each tile, the initial pair of piecewise bilinear bounding functions are iteratively adjusted 310 to move the respective minimum and maximum depth value of the initial pair of piecewise bilinear bounding functions for each tile closer to the HDR depth buffer, where no depth value of the initial piecewise bilinear bounding functions for adjacent tiles are adjusted in the same iteration.

Using the adjusted pair of piecewise bilinear bounding functions, a LDR depth buffer and tile data are generated 312. The tile data comprises metadata regarding the renormalisation of the HDR depth buffer. For example, the tile data may comprise metadata regarding the values of the piecewise bilinear bounding functions. This can be in the form of a pair of minimum and maximum depth values per tile. For example, with a tile size of 64×64, the tile data that is transmitted represents a less than 1% bandwidth overhead.

The LDR depth buffer is compressed 314 using a video encoder and the tile data is compressed 316 using a lossless compressor. The compressed LDR depth buffer and compressed tile data are transferred 318 to an HMD over a network.

As described above, a renormalisation approach for depth encoding includes finding a pair of parameterised bounding functions lo(x, y) and hi(x, y) which straddle the depth value d(x, y) of a depth buffer at each pixel location (x, y). As used herein, lo(x, y) and hi(x, y) represent the minimum and maximum bounding functions respectively. This leads to the following pair of parametrised bounding functions:

$$lo(x, y) \le d(x, y) \le hi(x, y)$$

These functions envelop the depth values. A luma value Y(x, y) may be computed by the remote computer. The luma value is a produced by the renormalisation. The luma value is quantised to a precision of n bits (e.g. n=8, 10, 12) that can be supported by standard video codec hardware.

$$Y(x, y) = \text{round} \left( 2^n * \frac{d(x, y) - lo(x, y)}{hi(x, y) - lo(x, y)} \right)$$

The equation below, or other methods known in the art for renormalisation of depth images, may be used to produce an LDR depth buffer. For example, to produce an 8-bit renormalised depth buffer (values ranging from 0-255), the minimum depth value in the tile may be mapped to 0 and the maximum depth value in the tile may be mapped to 255. Any values between the maximum and minimum depth values may be scaled proportionally between 0 and 255. Similarly, where the video codec supports 10- or 12-bit precision, the remapping occurs from 0-1023 and 0-4095 respectively.

When attempting to solve inequalities for piecewise bilinear bounds for a depth buffer, there are millions of constraints. Consequently, solving these constraints to find an optimal pair of bounding functions for an HDR depth buffer would typically take several seconds with known methods. The time taken to solve these inequalities using known methods adds significant delays to the transmission of data and can affect a user's experience.

By using the technology disclosed herein to determine a pair of piecewise bilinear bounding functions, a solution is provided to solving the millions of inequalities magnitudes faster than known methods. A pair of piecewise bilinear bounding functions are determined in approximately a millisecond, rather than several seconds, thereby significantly reducing delays in transmission of HDR depth images. Moreover, the determined pair of piecewise bilinear bounding functions fit tightly around the HDR depth buffer, thereby reducing the overall quantisation error. The determined functions are additionally determined with minimal computation and are easily encodable (e.g. via the tile data) and transmittable with a small amount of bandwidth.

Figure 4:
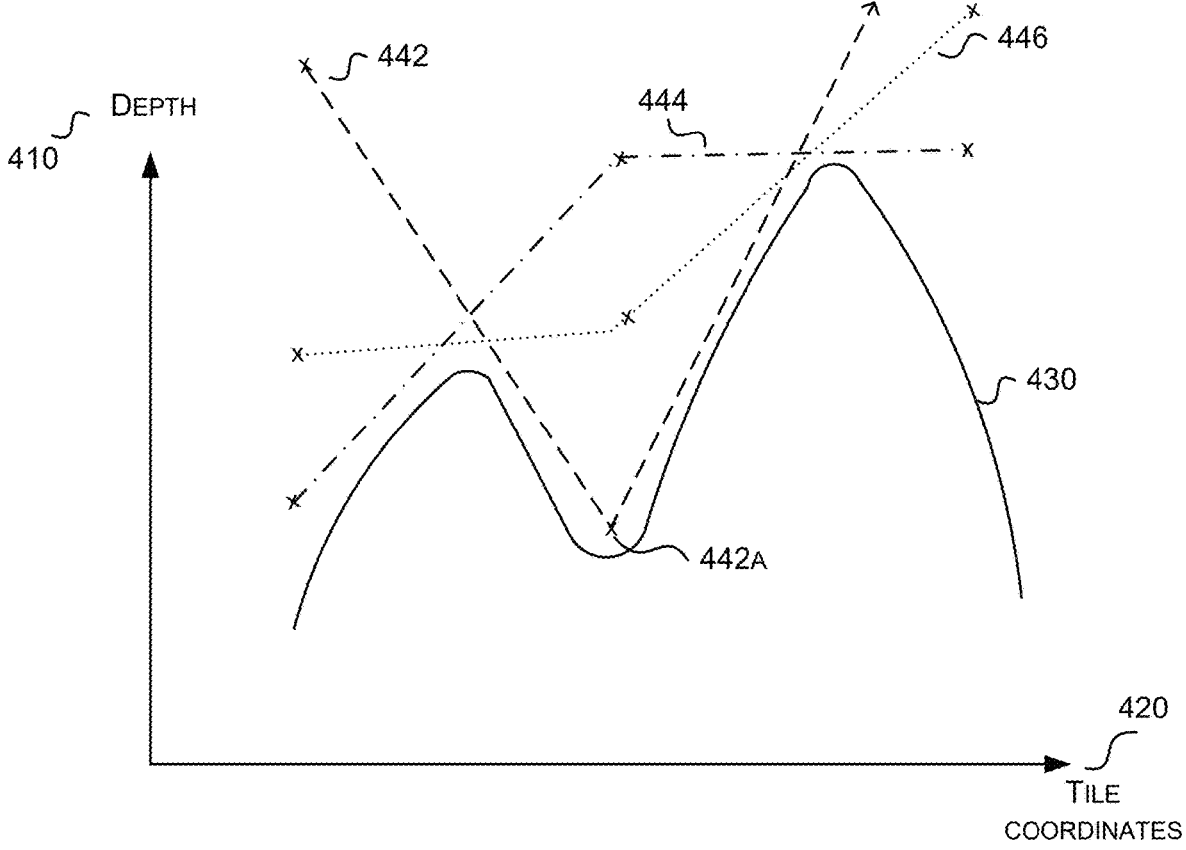
FIG. 4 illustrates an example graph depicting various example bounding functions for a depth image according to known techniques.

Referring to FIG. 4, a graph showing depth 410 against tile coordinates 420 is depicted. The solid black line represents the HDR depth buffer 430, the dashed line 442, dot-dashed line 444 and dotted line 446 represent several of infinite possibilities for maximum bounding functions, such that the depth buffer is always less than, or equal to, the maximum bounding functions 442, 444 and 446. Each "x" on the graph represents a position within a respective tile. For simplicity, the "x"s in FIG. 4 are selected to be respective centres of each tile. As can be seen in FIG. 4, an optimal maximum (or minimum) depth value for each tile cannot be selected independently of other tiles. For example, where the depth value 442a for the dashed line 442 is selected to be as close as possible to the valley of the depth buffer 430, so that the bounding function does not intersect with the depth buffer, the depth values at the adjacent tiles are selected to be a greater distance above the HDR depth buffer 430, which is not optimal.

Similarly, for the dot-dashed 444 and dotted 446 maximum bounding functions, the chosen depth values for the respective tiles are more moderate but they do not fit the "valley" of the HDR depth buffer 430 as well. The same principle applies to the infinite possibilities of piecewise bilinear bounding functions in that optimising a single tile to be as close as possible to the HDR depth buffer will lead to a global non-optimal result.

Figure 5:
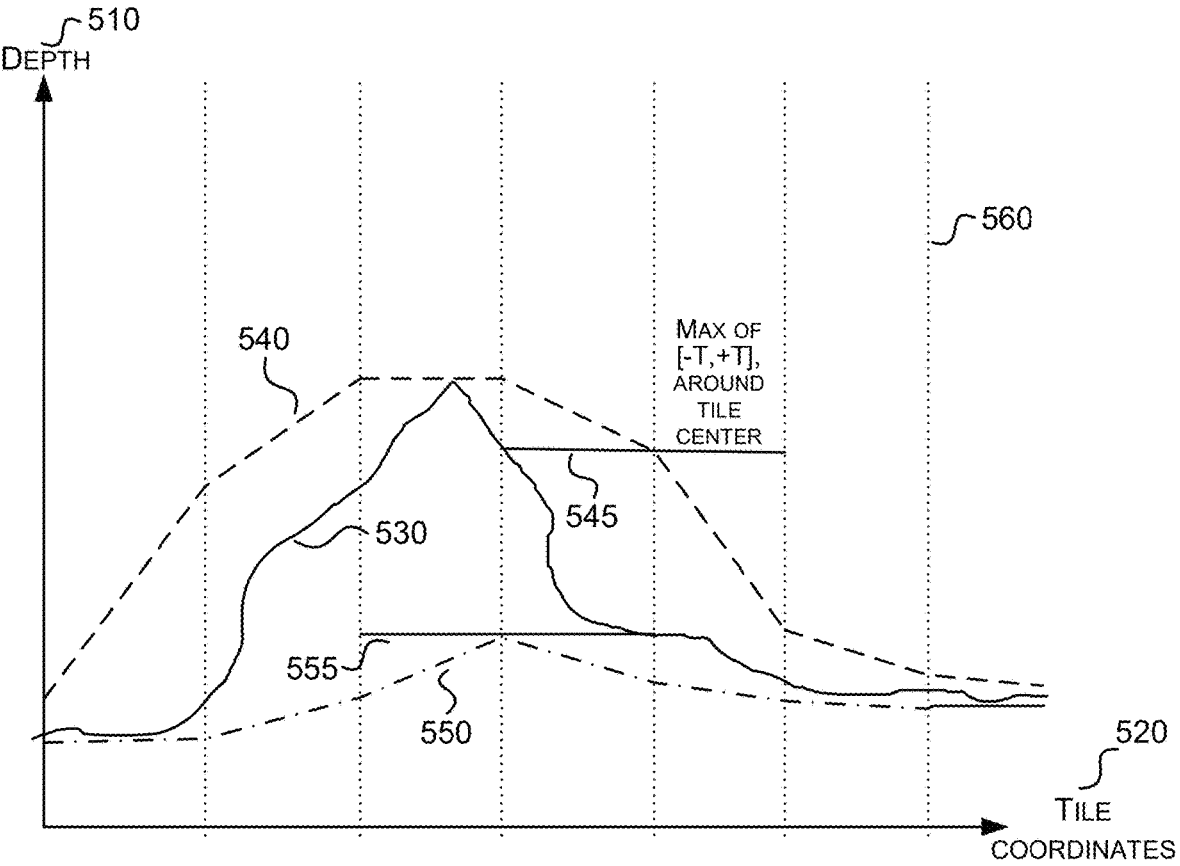
FIG. 5 illustrates an example graph depicting bounding functions for a depth image according to the present technology.

FIG. 5 is an illustration of how the remote computer determines an initial pair of piecewise bilinear bounding functions in one dimension. In FIG. 5, a graph is depicted showing depth 510 plotted against tile coordinates 520. In FIG. 5, the coordinates of the tile centres are marked by dotted lines 560. Whilst the graph is plotted with respect to the tile centres, a different point of the tile may be used as a reference point. Similarly to FIG. 4, in FIG. 5, the HDR depth buffer is depicted using solid black line 530. To determine the maximum piecewise bilinear bounding equation (i.e. a bounding equation that has a greater depth value than the HDR depth buffer for each tile in the HDR depth buffer), an initial maximum piecewise bilinear bounding function 540 is determined. To obtain the initial piecewise bilinear maximum bounding function, denoted by dashed line 540, the maximum depth value of the HDR depth buffer 530 in a region greater than a width of a tile is determined for each tile. The determined maximum depth values are connected to obtain the initial maximum piecewise bilinear bounding function 540. As an example, in FIG. 5, the width of the tile is denoted as "T" and the depth value of a tile for the initial maximum piecewise bilinear bounding function 540 is selected to be the maximum depth value of the HDR depth buffer 530 in a region 545 of 2T around the centre of each tile.

A similar process is followed to obtain the initial minimum piecewise bilinear bounding function, denoted by dot-dashed line 550. For each tile, the minimum depth value of the HDR depth buffer 530 in a region greater than a width of a tile is determined for each tile. The determined minimum depth values are connected to obtain the initial minimum piecewise bilinear bounding function 550. Similarly to the maximum piecewise bilinear bounding function, the width of the tile is T and the depth value of a tile for the initial minimum piecewise bilinear bounding function 550 is selected to be the minimum depth value of the HDR depth buffer 530 in a region 555 of 2T around the centre of each tile. For the same example in two dimensions (2D), a tile is selected to have width W and height H. In 2D, the corresponding initial region is a rectangle of width 2 W and height 2H.

Thus, when finding the initial piecewise bilinear bounding functions, the HDR depth buffer is scanned separately for each tile to find the respective maximum and minimum depth values in a rectangular region of extent 2T centred around each tile's centre. Owing to the extent of the region being scanned for each tile being greater than the width of the tile, the scanned regions for adjacent tiles will overlap. This ensures that none of the interpolated values between adjacent tiles violate any of the bounding function inequalities (i.e. that a maximum bounding function is greater than or equal to the HDR depth buffer at all tile locations and that a minimum bounding function is less than or equal to the HDR depth buffer at all tile locations).

By having overlapping regions for each adjacent tile when determining the respective minimum and maximum values of the HDR depth buffer, discontinuities in tile boundaries are not present, as compared to existing piecewise constant functions. This leads to a sufficiently smooth function that does not introduce spurious high frequencies into the video texture. The avoiding of the tile boundary discontinuities as a result of using the piecewise bilinear bounding functions reduces the amount of additional processing that is required to generate a uniform image at an HMD. Moreover, by using piecewise bilinear bounding functions, each tile may be processed independently of other tiles, allowing parallelisation of the initial piecewise bilinear bounding functions, for example in a parallel computing processor. This parallelisation further enables each tile to be processed at the same time which produces a balanced fit that does not need locally optimal fits at a detriment to the overall fit.

Whilst the initial pair of piecewise bilinear bounding functions is not an optimal fit, there are no large variations in distances of the initial piecewise bilinear bounding functions from the HDR depth buffer, as opposed to the example scenario depicted in FIG. 4. Moreover, as can be seen in FIG. 5, the upper bound (maximum piecewise bilinear bounding function) is exactly horizontal around the peak of the HDR depth buffer. Subsequent passes of the disclosed technology will preserve this invariant and will leave the tile values adjacent to this peak unchanged, preventing optimising the fit for one tile at the expense of pessimising the fit for another tile.

FIG. 6 illustrates an example two-dimensional visualisation of method 600 for optimising an initial pair of piecewise bilinear bounding functions. In this example, for simplicity, the HDR depth buffer is depicted as being segmented into a plurality of rows and columns of square tiles. However, it is noted that the tiles may have different shapes and that the HDR depth buffer may be segmented in different ways other than regular rows and columns.

Adjusting two adjacent tiles in parallel requires data communication between the parallel processors optimising the adjacent tiles to avoid violating the bounding function constraints. The data communication between processors of adjacent tiles introduces significant delays in the processing of the depth buffer. By processing a tile whilst leaving its nearest neighbours untouched (i.e. only adjusting adjacent tiles), the surroundings of the adjacent tiles can be ignored without requiring any inter-process or inter-thread communications. By ensuring that no adjacent tile is optimised in a single pass, the fit of the piecewise bilinear of one tile is not optimised at the expense of another tile. As referred to herein, a "pass" is equivalent to an iteration of the method.

In FIG. 6, to avoid adjusting the depth values of the initial pair of bilinear piecewise bounding functions for adjacent tiles, the depth values of the initial pair of piecewise bilinear bounding functions are only adjusted for every other tile in every other column (which is also equivalent to every other tile in every other row) in the first pass. As depicted in FIG. 6, in the first pass ("pass 1"), only the odd tiles in every odd column is adjusted. Then, in the second pass ("pass 2"), every odd tile in every even column is adjusted. In the third pass ("pass 3"), every even tile in every odd column is adjusted and in the fourth pass ("pass 4"), every even tile in every even column is adjusted.

It is noted that the order in which the depth values for the tiles are adjusted in the respective passes is not of importance. For example, instead of every odd tile in every odd column having its depth value adjusted, every even tile in every odd column etc. could have its depth values adjusted in the first pass and so on.

In this way, optimising is complete once every tile has had its respective depth values adjusted to move each tile's maximum and minimum depth value of the pair of piecewise bilinear bounding functions closer to the HDR depth buffer distribution. For example, the respective minimum and maximum depth values of a tile are adjusted until an interpolated value between adjacent tiles becomes tangential to the HDR depth buffer distribution. By only tightening a subset of tiles in each pass such that no pair of neighbouring tiles are modified in a single pass, the technology disclosed herein can be performed on a parallel processor.

Figure 7:
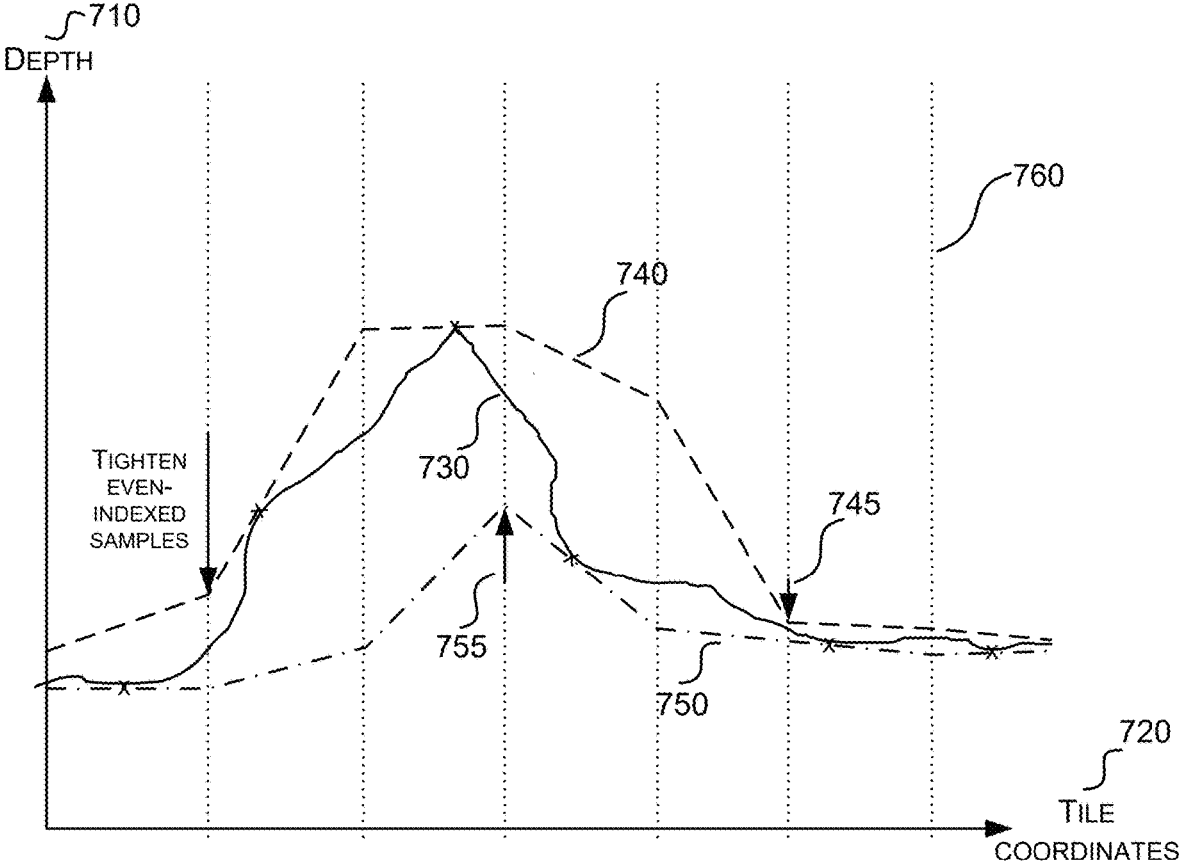
FIG. 7 illustrates an example graph depicting bounding functions for a depth image according to the present technology.

FIG. 7 illustrates an example graph depicting bounding functions for a depth buffer in one dimension following a first pass of optimisation of the initial pair of piecewise bilinear bounding functions. In FIG. 7, a graph is depicted showing depth 710 plotted against tile coordinates 720. In FIG. 7, similarly to FIG. 5, the coordinates of the tile centres are marked by dotted lines 760 and the HDR depth buffer is depicted by solid line 730. The pair of piecewise bilinear bounding functions 740, 750 are similar to those shown in FIG. 5 but have undergone a pass of adjusting of the depth values, as depicted by arrows 745 and 755. In the example shown in FIG. 7, the pair of piecewise bilinear bounding functions are adjusted only for even-indexed tiles, leaving the depth values of the pair of piecewise bilinear bounding functions unchanged for odd-indexed tiles. The up and down arrows 745, 755 show an improvement of the pair of piecewise bilinear bounding functions compared to the initial pair of piecewise bilinear bounding functions shown in FIG. 5.

In FIG. 7, where the depth values of a tile are adjusted, the respective maximum and minimum depth values for the tile are moved closer to the HDR depth buffer 730 depth values until the interpolated line between adjacent tiles becomes tangential to the HDR depth values. Where the interpolated lines are tangential to the HDR depth buffer distribution 730, this is marked with an "x". The tightening of the even-indexed tiles is followed by a tightening of the odd-indexed tiles, whilst performing no further tightening of the even-indexed tiles. This is depicted in FIG. 8.

Figure 8:
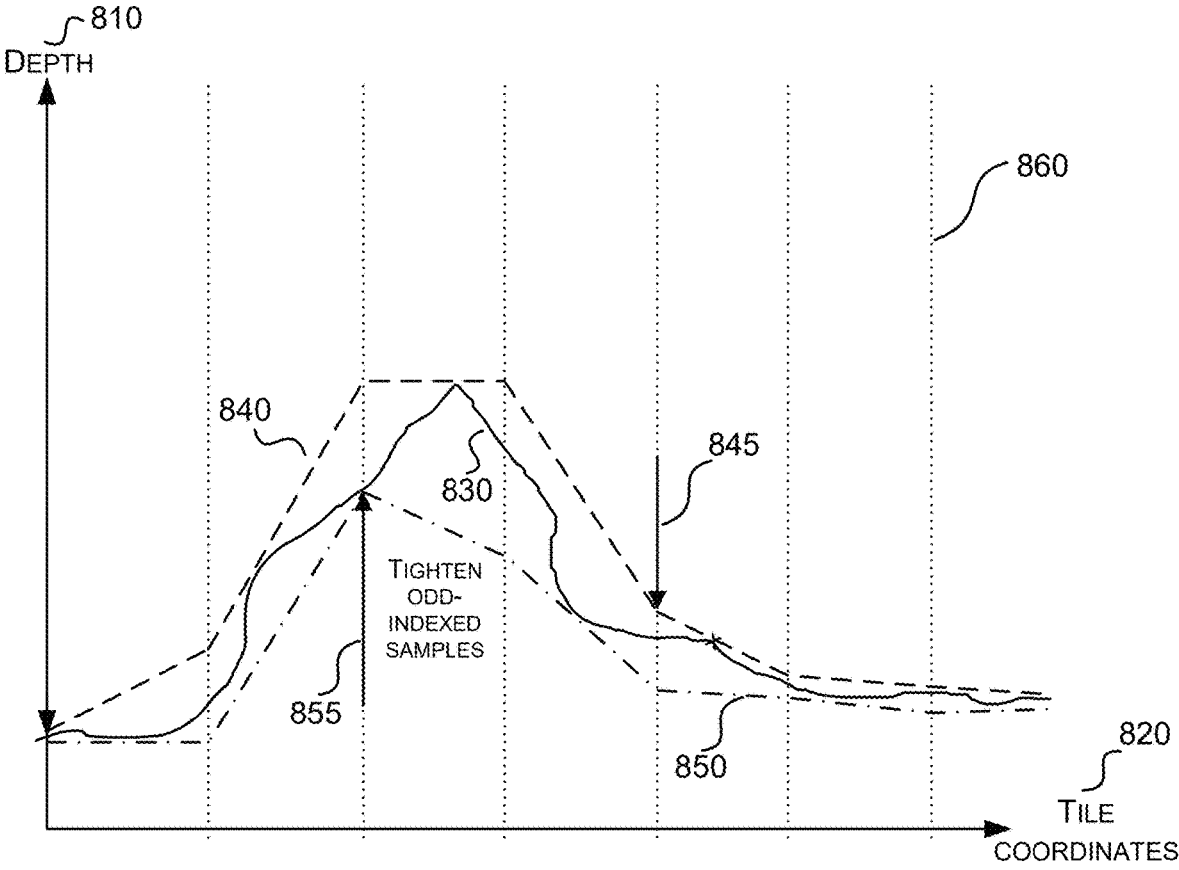
FIG. 8 illustrates an example graph depicting bounding functions for a depth image according to the present technology.

FIG. 8 illustrates an example graph depicting bounding functions for a depth buffer in one dimension following a second pass of optimisation of the initial pair of piecewise bilinear bounding functions. In FIG. 8, a graph is depicted showing depth 810 plotted against tile coordinates 820. In FIG. 8, similarly to FIGS. 5 and 7, the coordinates of the tile centres are marked by dotted lines 860 and the HDR depth buffer is depicted by solid line 830. The pair of piecewise bilinear bounding functions 840, 850 are similar to those shown in FIGS. 5 and 7 but have undergone a second pass of adjusting of the depth values, as depicted by arrows 845 and 855. In the example shown in FIG. 8, following the first pass, the pair of piecewise bilinear bounding functions are adjusted only for odd-indexed tiles, leaving the depth values of the pair of piecewise bilinear bounding functions unchanged for even-indexed tiles. The up and down arrows 845, 855 show an improvement of the pair of piecewise bilinear bounding functions compared to the initial and first pass adjusted pair of piecewise bilinear bounding functions shown in FIGS. 5 and 7 respectively.

In FIG. 8, where the depth values of a tile are adjusted, the respective maximum and minimum depth values for the tile are moved closer to the HDR depth buffer 830 depth values until the interpolated line between adjacent tiles becomes tangential to the HDR depth values. Where the interpolated lines are tangential to the HDR depth buffer distribution 830, this is marked with an "x".

Whilst FIGS. 7 and 8 illustrate an optimisation of the initial pair of piecewise bilinear bounding functions in one-dimension and with two passes, it is noted that in two dimensions, there will be four tightening passes (as depicted in FIG. 6) to cover all tiles.

The technologies herein provide a localised approach for optimising piecewise bilinear bounding functions to an HDR depth buffer. As the result of each of the passes can be produced independently for each tile, a massively parallel computing device is able to perform each pass, resulting in overall computational times of less than a millisecond—an improvement of over 1000 times compared to state of the art general purpose linear constraint solvers.

Referring again to FIG. 2, the LDR depth buffer 216 and tile data 218 are compressed using a video encoder and a lossless compressor respectively and are transferred to an HMD 230 over a data network 220. At the HMD, the LDR depth buffer and the tile data are used to reconstruct the HDR depth buffer. The reconstructed HDR depth buffer may then be used to perform late-stage reprojection or composition of the HDR depth buffer with local content or other content.

Figure 9:
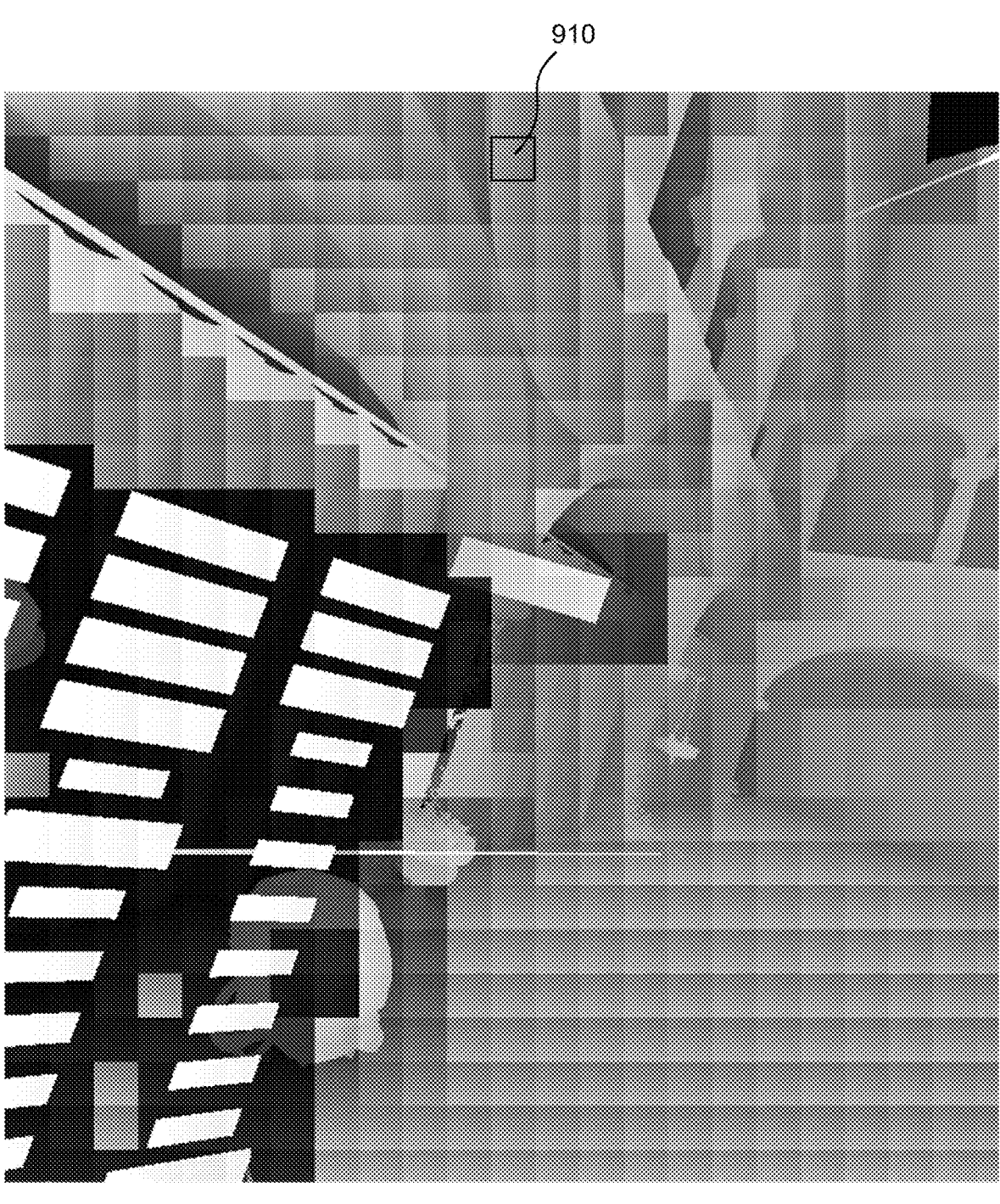
FIG. 9 illustrates an example renormalised depth image according to known techniques.

FIG. 9 illustrates an example of the LDR depth buffer 900 obtained from known approaches of piecewise constant bounding functions. As known methods renormalise an HDR depth buffer by mapping depth values directly to, for example, a 0-255 range for an 8 bit depth image, disconti-nuities around the tile borders are introduced in the LDR depth image sent to the video encoder for sending to an HMD over a network. The tile structure is clearly visible in FIG. 9, with each edge between tiles being a discontinuity that introduces spurious high frequency components into the image sent to the video encoder. The tile boundaries of a single tile in the LDR depth buffer 900 are outlined by square 910. This requires additional bits to encode these edges, despite the edges not representing any features of the original HDR depth image.

Figure 10:
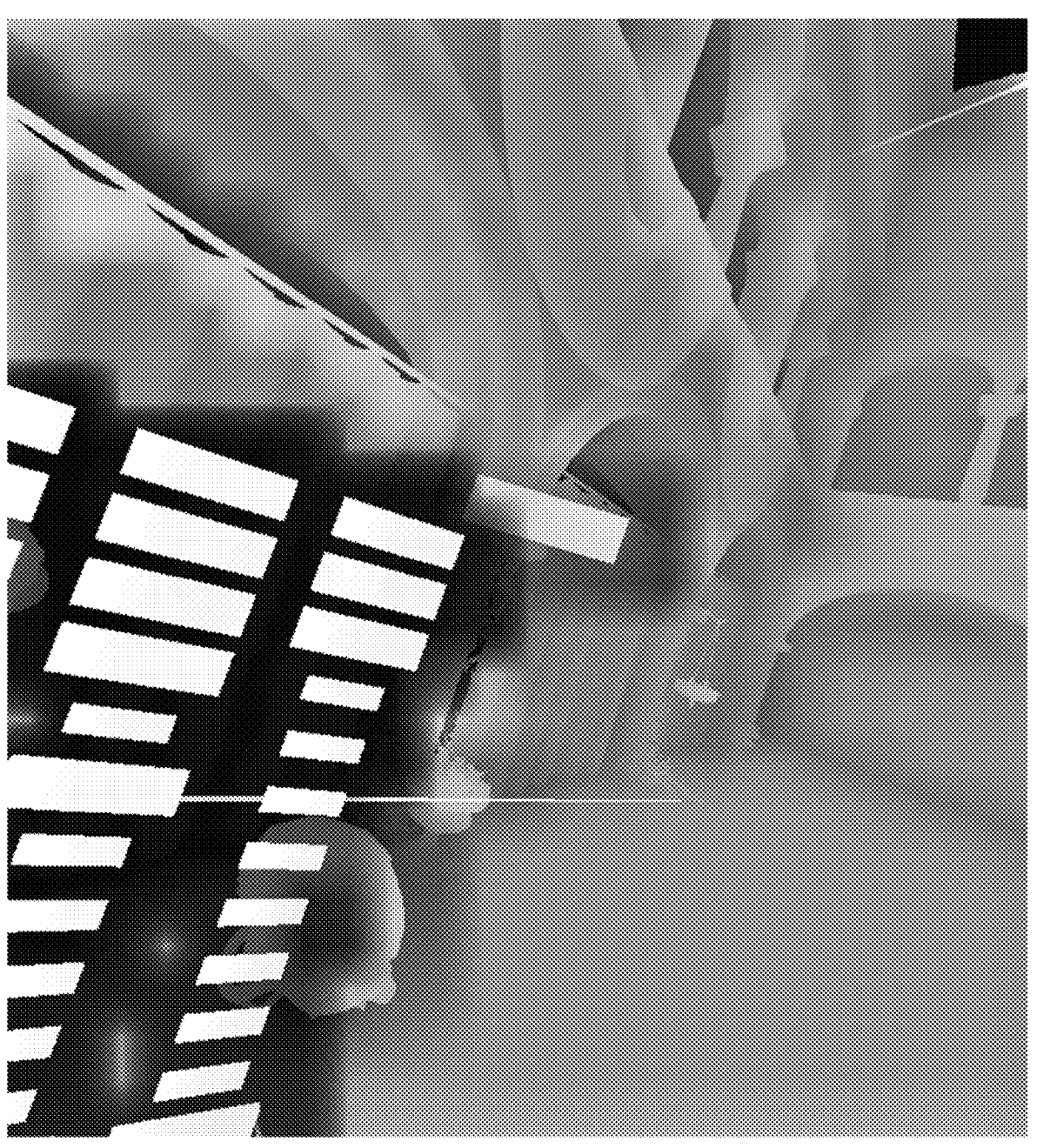
FIG. 10 illustrates an example renormalised depth image according to the present technology.

FIG. 10 illustrates an example of the LDR depth buffer 1000 obtained from the present technology. By using piece-wise bilinear functions, the obtained LDR depth buffer has no discontinuities between tiles and as such requires less bandwidth to compress using a video encoder.

An example flow of a method performed by an HMD is illustrated in FIG. 11. In FIG. 11, an encoded LDR depth buffer and compressed tile data are received 1102 at the HMD. A video decoder of the HMD decodes 1104 the encoded LDR depth buffer and a decompressor decom-presses 1104 the compressed tile data. The HMD recon-structs 1106 an HDR depth buffer from the decoded LDR depth buffer and the decompressed tile data using a piece-wise bilinear reconstruction function. For example, a hard-ware sampling unit on a GPU of the HMD may be used to perform piecewise bilinear interpolation of tile bounds in the LDR depth buffer to obtain the HDR depth buffer. This can be done with a pair of texture fetches and simple arithmetic instructions, shown below in high level shading language (HLSL):

```
//Load bounds from texture containing per-tile min and max
float2 hiLo = bounds Texture.Sample(nearestNeighborSampler, uv);
// Load depth value from decoded depth video texture
float depthValue = depthVideoTexture.Sample(depthSampler, uv);
//Rescale to full range
depthValue=lerp(depthValue, hiLo.x, hiLo.y);
```

For example, when reconstructing the original HDR depth image from the LDR image and tile data, sampled values from the decoded LDR depth buffer may be remapped such that e.g. 0 is mapped to the minimum depth value of each tile and 255 is mapped to the maximum depth value of each tile. The remaining depth values are scaled accordingly.

As described above, a renormalisation approach for depth encoding includes finding a pair of parameterised bounding functions lo(x, y) and hi(x, y) which straddle the depth value d(x, y) of a depth buffer at each pixel location (x, y). As used herein, lo(x, y) and hi(x, y) represent the minimum and maximum bounding functions respectively. This leads to the following pair of parametrised bounding functions:

$$lo(x, y) \le d(x, y) \le hi(x, y)$$

These functions envelop the depth values. A luma value Y(x, y), such as that computed on the remote computer, is computed. The luma value is quantised to a precision of n bits (e.g. n=8, 10, 12) that can be supported by standard video codec hardware.

$$Y(x, y) = \text{round}\left(2^n * \frac{d(x, y) - lo(x, y)}{hi(x, y) - lo(x, y)}\right)$$

On the HMD, the HDR depth buffer may be reconstructed by interpolating between the lo(x, y) and hi(x, y) bounds. This may be done according to the below equation:

$$d(x, y) = 2^{-n} * (Y(x, y) * (hi(x, y) - lo(x, y)) + lo(x, y))$$

The quality of the depth reconstruction depends largely on the selection of the bounding functions used for the recon-struction. As the bounding functions of the present technol-ogy fit tightly around the HDR depth values, the overall quantisation error is reduced. The tighter the fit of the piecewise bilinear bounding functions, the fewer the number of quantisation errors which are introduced through round-ing which occurs during renormalisation. Moreover, owing to the tight fit of the bounding functions and the lack of discontinuities of tiles in the LDR depth image, reconstruc-tion of the HDR depth image is performed on the HMD with a minimal amount of computation.

The determination of piecewise bilinear bounding func-tions of the present disclosure operates in an unconventional manner to achieve the bandwidth reduction and significant increase of processing speeds of the disclosure. By determining the piecewise bilinear bounding functions which eliminate discontinuities in the renormalised depth buffer whilst maintaining the high accuracy of the HDR depth buffer, the functioning of the underlying computing device is improved.

Figure 12:
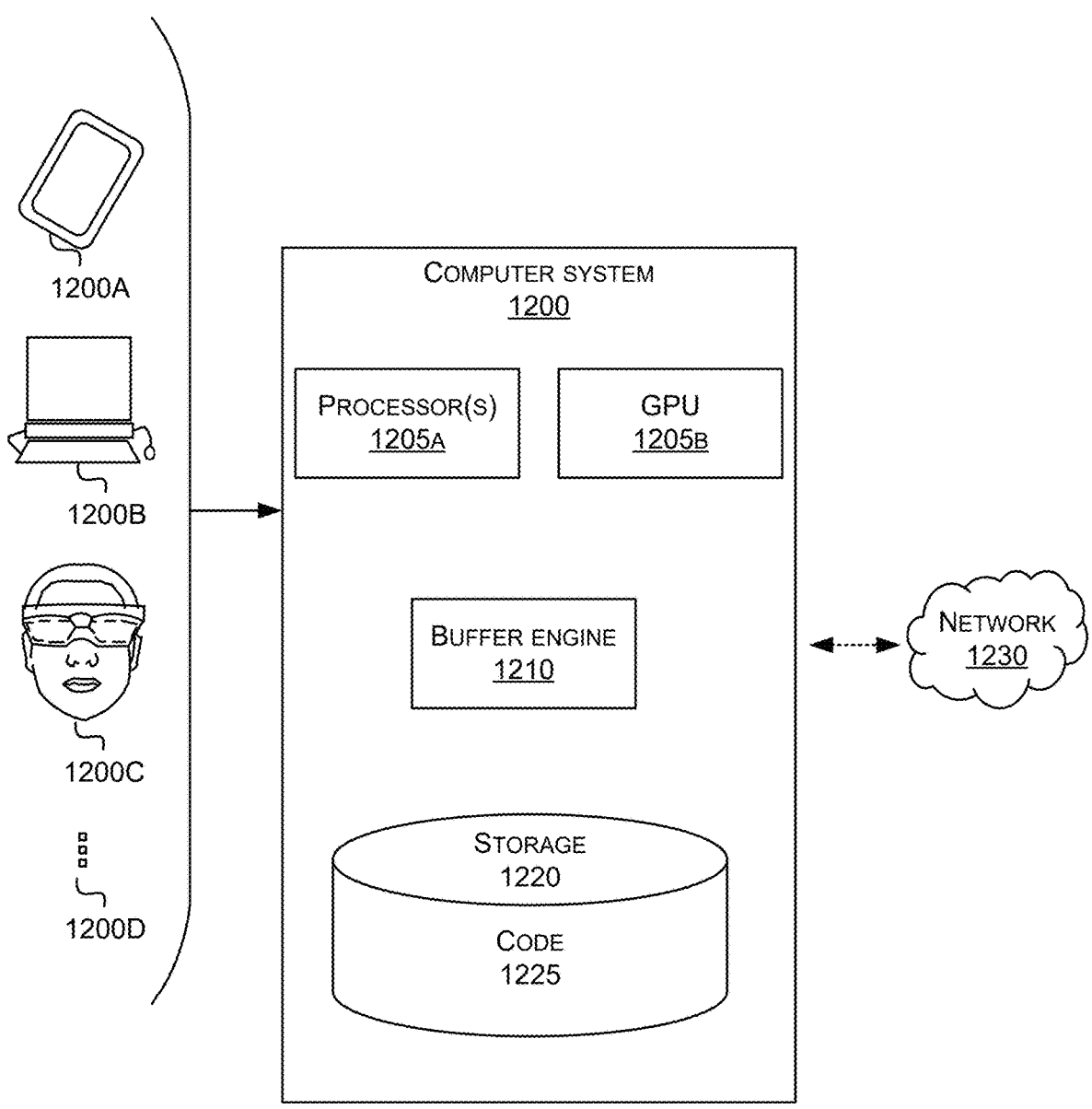
FIG. 12 illustrates an exemplary computing-based device in which examples of remote rendering are implemented.

FIG. 12 illustrates various components of an exemplary computer system 1200 which are implemented as any form of a computing and/or electronic device, and in which embodiments of FIGS. 1 to 10 are implemented in some examples. Computer 1200 may take various different forms. For example, in the case the computer system 1200 is used to deploy the remote computer described herein, the computer system 1200 may be a server or compute node or distributed compute functionality. In some examples the computer system 1200 is an HMD.

Computer system 1200 may also be a distributed system that includes one or more connected computing components/ devices that are in communication with the computer system 1200.

In its most basic configuration, computer system 1200 includes various different components. FIG. 12 shows that computer system 1200 includes one or more processor(s) 1205A (aka a "hardware processing unit"), GPU(s) 1205B, a buffer engine 1210, and storage 1220.

Regarding the processor(s) 1205A and the GPU(s) 1205B, it will be appreciated that the functionality described herein can be performed, at least in part, by one or more hardware logic components (e.g., the processor(s) 1205A or GPU(s) 1205B). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical/Graphics Processing Units ("GPU"), or any other type of programmable hardware.

The buffer engine 1210 may be implemented to perform any of the operations with regard to generating and modifying the depth buffer. Additionally, or alternatively, the processor(s) 1205A or the GPU(s) 1205B may be involved as well. The buffer engine 1210 may be implemented as a specific processing unit (e.g., a dedicated processing unit as described earlier) configured to perform one or more specialized operations for the computer system 1000. As used herein, the terms "executable module," "executable component," "component," "module," or "engine" can refer to hardware processing units or to software objects, routines, or methods that may be executed on computer system 1200. The different components, modules, engines, and services described herein may be implemented as objects or processors that execute on computer system 1200 (e.g. as separate threads).

Storage 1220 may be physical system memory, which may be volatile, non-volatile, or some combination of the two. The term "memory" may also be used herein to refer to non-volatile mass storage such as physical storage media. If computer system 1000 is distributed, the processing, memory, and/or storage capability may be distributed as well.

Storage 1220 is shown as including executable instructions (i.e. code 1225). The executable instructions represent instructions that are executable by the processor(s) 1205A (or perhaps even the GPU(s) 1205B or the buffer engine 1210) of computer system 1200 to perform the disclosed operations, such as those described in the various methods.

The disclosed embodiments may comprise or utilize a special-purpose or general-purpose computer including computer hardware, such as, for example, one or more processors (such as processor(s) 1205A) and system memory (such as storage 1220), as discussed in greater detail below. Embodiments also include physical and other computer-readable storage media for carrying or storing computer-executable instructions and/or data structures. Such computer-readable storage media can be any available media that can be accessed by a general-purpose or special-purpose computer system. Computer-readable storage media that store computer-executable instructions in the form of data are "physical computer storage media" or a "hardware storage device." Computer-readable storage media that carry computer-executable instructions are "transmission media." In contrast, communication media embody computer readable instructions, data structures, program modules, or the like in a modulated data signal, such as a carrier wave, or other transport mechanism. As defined herein, computer-readable storage media does not include communication media. Therefore, a computer storage medium does not include a propagating signal. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1200 may also be connected (via a wired or wireless connection) to external sensors (e.g., one or more remote cameras) or devices via a network 1230. For example, computer system 1200 can communicate with any number devices or cloud services to obtain or process data. In some cases, network 1230 may itself be a cloud network. Furthermore, computer system 1200 may also be connected through one or more wired or wireless networks 1230 to remote/separate computer systems(s) that are configured to perform any of the processing described with regard to computer system 1200.

The computer system 1200 also may also comprise an input/output controller arranged to output display information to a display device which may be separate from or integral to the computing-based device 1200. The display information may provide a graphical user interface. The input/output controller is also arranged to receive and process input from one or more devices, such as a user input device (e.g. a mouse, keyboard, camera, microphone or other sensor). In some examples the user input device detects user gestures or other user actions and provides a natural user interface (NUI). This user input may be used to obtain HDR depth images.

Any of the input/output controller, display device and the user input device may comprise NUI technology which enables a user to interact with the computer system in a natural manner, free from artificial constraints imposed by input devices such as mice, keyboards, remote controls and the like. Examples of NUI technology that are provided in some examples include but are not limited to those relying on gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

A "network," like network 1230, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1200 will include one or more communication channels that are used to communicate with the network 1230. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Alternatively or in addition to the other examples described herein, examples include any combination of the following:

Clause A. A computer-implemented method, comprising: receiving a high dynamic range depth buffer; decomposing the high dynamic range depth buffer into a low dynamic range depth image and tile data, wherein decomposing the high dynamic range depth buffer comprises: segmenting the high dynamic range depth buffer into a first and second tile; for each of the first and second tiles, determining a respective maximum and minimum value of the high dynamic range depth buffer in a region greater than a width of the respective tile; determining an initial pair of piecewise bilinear bounding functions for the high dynamic range depth buffer using the determined maximum and minimum depth values of the high dynamic range depth buffer in the region greater than the width of the respective tile; for each tile, iteratively adjusting the initial pair of piecewise bilinear bounding functions to move the respective minimum and maximum depth value of each tile closer to the high dynamic range depth buffer, wherein no adjacent tile is adjusted in the same iteration; and using the adjusted pair of piecewise bilinear bounding functions, generating a low dynamic range depth buffer and tile data; compressing, using a video encoder, the low dynamic range depth buffer; compressing, using a lossless compressor, the tile data; and transferring, over a data network, the compressed low dynamic range depth buffer and compressed tile data to a head mounted device (HMD).

Clause B. The method of clause A, wherein the initial pair of piecewise bilinear bounding functions comprise a maximum bounding function and a minimum bounding function, wherein: determining the maximum bounding function comprises, at a coordinate of each tile, selecting a depth that is at least the determined maximum depth value for the respective tile in the region; and determining the minimum bounding function comprises, at a coordinate of each tile, selecting a depth that is at most the determined minimum depth value for the respective tile in the region.

Clause C. The method of clause B, wherein the coordinate at which the depth is selected for each tile in the respective maximum and minimum bounding functions is a respective centre point of each tile.

Clause D. The method of any preceding clause, wherein the region of greater width than the width of the respective tile is double the width of the tile.

Clause E. The method of any preceding clause wherein the high dynamic range depth buffer is segmented into a plurality of rows and columns, and wherein iteratively adjusting the determined pair of piecewise bilinear bounding functions comprises: in a first pass, adjusting the respective depth values of the initial pair of piecewise bilinear bounding functions for every other tile in every other column of the plurality of columns to bring the respective depth values of the initial pair of piecewise bilinear bounding functions closer to the depth value of the high dynamic range depth buffer of the respective tile; in a second pass, for each row in which the depth values of the initial pair of piecewise bilinear bounding functions were adjusted in the first pass, adjusting the depth values of the initial pair of piecewise bilinear bounding functions for tiles which are adjacent to the tiles whose depth values were adjusted in the first pass to bring the respective depth values of the initial pair of piecewise bilinear bounding functions closer to the depth value of the high dynamic range depth buffer of the respective tile; in a third pass, for each column in which the depth values of the initial pair of piecewise bilinear bounding functions were adjusted in the first pass, adjusting the depth values of the initial pair of piecewise bilinear bounding functions for tiles which are adjacent to the tiles whose depth values were adjusted in the first pass to bring the respective depth values of the initial pair of piecewise bilinear bounding functions closer to the depth value of the high dynamic range depth buffer of the respective tile; and in a fourth pass, for each row in which the depth values of the initial pair of piecewise bilinear bounding functions were adjusted in the third pass, adjusting the depth values of the initial pair of piecewise bilinear bounding functions for tiles which are adjacent to the tiles whose depth values were adjusted in the third pass to bring the respective depth values of the initial pair of piecewise bilinear bounding functions closer to the depth value of the high dynamic range depth buffer of the respective tile.

Clause F. The method of Clause E, wherein adjusting the depth values of the initial pair of piecewise bilinear bounding functions for a tile to bring the depth values closer to the depth value of the high dynamic range depth buffer comprises adjusting the depth values of the initial pair of piecewise bilinear bounding functions until an interpolated line between adjacent tiles is tangential to the high dynamic range depth buffer.

Clause G. The method of any preceding clause wherein tile data comprises metadata including a pair of maximum and minimum depth values per tile.

Clause H. The method of any preceding clause wherein generating a low dynamic range depth buffer comprises, for each tile, mapping a minimum depth value in a tile to a minimum value of an n-bit precision LDR depth buffer and mapping a maximum depth value in the tile to a maximum value of the n-bit precision LDR depth buffer.

Clause I. The method of Clause H, wherein generating a low dynamic range depth buffer further comprises scaling depth values between the minimum and the maximum depth values for each tiles proportionally between the minimum and maximum value of the n-bit precision LDR depth buffer.

Clause J. The method of Clause H or I, wherein the n-bit precision LDR depth buffer is an 8-bit LDR depth buffer and the minimum value of the 8 bit LDR depth buffer is 0 and the maximum value of the 8-bit LDR depth buffer is 255.

Clause K. A computer-implemented method performed on a head-mounted device (HMD), comprising: receiving a compressed low dynamic range depth buffer and compressed tile data; decoding, using a video decoder, the compressed low dynamic range depth buffer and, using a decompressor, the compressed tile data; and reconstructing, using a piecewise bilinear interpolation function, a high dynamic range depth buffer from the decoded low dynamic range depth buffer and the decoded tile data.

Clause L. The method of Clause K, wherein the reconstructed high dynamic range depth buffer is used for late stage reprojection of a colour image.

Clause M. The method of Clause K, wherein the reconstructed high dynamic range depth buffer is used for composition of the HDR depth image with local content.

Clause N. The method of Clauses K to M, wherein the HMD comprises a hardware sampling unit on a GPU which is configured to perform the piecewise bilinear interpolation function.

Clause O. The method of Clauses K to N, wherein the piecewise bilinear interpolation function is performed using texture fetches and arithmetic instructions.

Clause P. The method of Clauses K to O, wherein the piecewise bilinear interpolation function is performed using texture fetches and arithmetic instructions.

Clause Q. The method of Clause P, wherein reconstructing the high dynamic range depth buffer from the decoded low dynamic range depth buffer and decompressed tile data comprises, for each tile, remapping a minimum depth value of the low dynamic range depth buffer to a minimum depth value in the tile data and remapping a maximum value of the low dynamic range depth buffer to a maximum depth value in the tile data for the respective tile.

Clause R. The method of Clause Q, wherein for each tile, depth values between the minimum and maximum depth values of the low dynamic range depth buffer are scaled proportionally between the minimum and maximum depth values included in the tile data.

Clause S. A system, comprising: a remote computing device, wherein the remote computing device is configured to: receive a high dynamic range depth buffer; decompose the high dynamic range depth buffer into a low dynamic range depth image and tile data, wherein decomposing the high dynamic range depth buffer comprises the remote computing device being configured to: segment the high dynamic range depth buffer into a plurality of tiles; for each of the plurality of tiles, determine a respective maximum and minimum value of the high dynamic range depth buffer in a region greater than a width of the respective tile; determine an initial pair of piecewise bilinear bounding functions for the high dynamic range depth buffer using the determined maximum and minimum values of the high dynamic range depth buffer in the region greater than the width of the respective tile; for each tile, iteratively adjust the initial pair of piecewise bilinear bounding functions to move the respective minimum and maximum value of each tile closer to the high dynamic range depth buffer, wherein no adjacent tile is adjusted in the same iteration; and using the adjusted pair of piecewise bilinear bounding functions, generate a low dynamic range depth buffer and tile data; compress, using a video encoder, the low dynamic range depth buffer; transfer, over a data network, the compressed low dynamic range depth buffer and compressed tile data to a head-mounted device (HMD); and the HMD, wherein the HMD is configured to: receive the compressed low dynamic depth buffer and the compressed tile data; decode, using a video decoder, the compressed low dynamic range depth buffer and, using a decompressor, the compressed tile data; and reconstruct, using a piecewise bilinear interpolation function, a high dynamic range depth buffer from the decoded low dynamic range depth buffer and the decoded tile data.

Clause T. The method of Clause S, wherein the HMD comprises a hardware sampling unit on a GPU which is configured to perform the piecewise bilinear interpolation function.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term "subset" means at least one item of a set but not all items of the set. The term "subset" does not include the empty set.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method, comprising:
receiving a high dynamic range depth buffer;
decomposing the high dynamic range depth buffer into a low dynamic range depth buffer and tile data, wherein decomposing the high dynamic range depth buffer comprises:
segmenting the high dynamic range depth buffer into a first and second tile;
for each of the first and second tiles, determining a respective maximum and minimum value of the high dynamic range depth buffer in a region greater than a width of the respective tile;
determining an initial pair of piecewise bilinear bounding functions for the high dynamic range depth buffer using the determined maximum and minimum depth values of the high dynamic range depth buffer in the region greater than the width of the respective tile;
for each tile, iteratively adjusting the initial pair of piecewise bilinear bounding functions to move the respective minimum and maximum depth value of each tile closer to the high dynamic range depth buffer, wherein no adjacent tile is adjusted in the same iteration; and
using the adjusted pair of piecewise bilinear bounding functions, generating a low dynamic range depth buffer and tile data;
compressing, using a video encoder, the low dynamic range depth buffer;
compressing, using a lossless compressor, the tile data; and
transferring, over a data network, the compressed low dynamic range depth buffer and compressed tile data to a head mounted device (HMD).

2. The method of claim 1, wherein the initial pair of piecewise bilinear bounding functions comprise a maximum bounding function and a minimum bounding function, wherein:
determining the maximum bounding function comprises, at a coordinate of each tile, selecting a depth that is at least the determined maximum depth value for the respective tile in the region; and
determining the minimum bounding function comprises, at a coordinate of each tile, selecting a depth that is at most the determined minimum depth value for the respective tile in the region.

3. The method of claim 2, wherein the coordinate at which the depth is selected for each tile in the respective maximum and minimum bounding functions is a respective centre point of each tile.

4. The method of claim 1, wherein the region of greater width than the width of the respective tile is double the width of the tile.

5. The method of claim 1, wherein the high dynamic range depth buffer is segmented into a plurality of rows and columns, and wherein iteratively adjusting the determined pair of piecewise bilinear bounding functions comprises:
in a first pass, adjusting the respective depth values of the initial pair of piecewise bilinear bounding functions for every other tile in every other column of the plurality of columns to bring the respective depth values of the initial pair of piecewise bilinear bounding functions closer to the depth value of the high dynamic range depth buffer of the respective tile;

in a second pass, for each row in which the depth values of the initial pair of piecewise bilinear bounding functions were adjusted in the first pass, adjusting the depth values of the initial pair of piecewise bilinear bounding functions for tiles which are adjacent to the tiles whose depth values were adjusted in the first pass to bring the respective depth values of the initial pair of piecewise bilinear bounding functions closer to the depth value of the high dynamic range depth buffer of the respective tile;

in a third pass, for each column in which the depth values of the initial pair of piecewise bilinear bounding functions were adjusted in the first pass, adjusting the depth values of the initial pair of piecewise bilinear bounding functions for tiles which are adjacent to the tiles whose depth values were adjusted in the first pass to bring the respective depth values of the initial pair of piecewise bilinear bounding functions closer to the depth value of the high dynamic range depth buffer of the respective tile; and in a fourth pass, for each row in which the depth values of the initial pair of piecewise bilinear bounding functions were adjusted in the third pass, adjusting the depth values of the initial pair of piecewise bilinear bounding functions for tiles which are adjacent to the tiles whose depth values were adjusted in the third pass to bring the respective depth values of the initial pair of piecewise bilinear bounding functions closer to the depth value of the high dynamic range depth buffer of the respective tile.

6. The method of claim 5, wherein adjusting the depth values of the initial pair of piecewise bilinear bounding functions for a tile to bring the depth values closer to the depth value of the high dynamic range depth buffer comprises adjusting the depth values of the initial pair of piecewise bilinear bounding functions until an interpolated line between adjacent tiles is tangential to the high dynamic range depth buffer.

7. The method of claim 1, wherein tile data comprises metadata including a pair of maximum and minimum depth values per tile.

8. The method of claim 1, wherein generating a low dynamic range depth buffer comprises, for each tile, mapping a minimum depth value in a tile to a minimum value of an n-bit precision low dynamic range (LDR) depth buffer and mapping a maximum depth value in the tile to a maximum value of the n-bit precision LDR depth buffer.

9. The method of claim 8, wherein generating a low dynamic range depth buffer further comprises scaling depth values between the minimum and the maximum depth values for each tiles proportionally between the minimum and maximum value of the n-bit precision LDR depth buffer.

10. The method of claim 9, wherein the n-bit precision LDR depth buffer is an 8-bit LDR depth buffer and the minimum value of the 8 bit LDR depth buffer is 0 and the maximum value of the 8-bit LDR depth buffer is 255.

11. A computer-implemented method performed on a head-mounted device (HMD), comprising:

receiving a compressed low dynamic range depth buffer and compressed tile data;

decoding, using a video decoder, the compressed low dynamic range depth buffer and, using a decompressor, the compressed tile data; and reconstructing, using a piecewise bilinear interpolation function, a high dynamic range depth buffer from the decoded low dynamic range depth buffer and the decoded tile data.

12. The method of claim 11, wherein the reconstructed high dynamic range depth buffer is used for late stage reprojection of a colour image.

13. The method of claim 11, wherein the reconstructed high dynamic range depth buffer is used for composition of the HDR depth image with local content.

14. The method of claim 11, wherein the HMD comprises a hardware sampling unit on a graphics processing unit (GPU) which is configured to perform the piecewise bilinear interpolation function.

15. The method of claim 14, wherein the piecewise bilinear interpolation function is performed using texture fetches and arithmetic instructions.

16. The method of claim 11, wherein tile data comprises metadata including a pair of maximum and minimum depth values per tile.

17. The method of claim 16, wherein reconstructing the high dynamic range depth buffer from the decoded low dynamic range depth buffer and decompressed tile data comprises, for each tile, remapping a minimum depth value of the low dynamic range depth buffer to a minimum depth value in the tile data and remapping a maximum value of the low dynamic range depth buffer to a maximum depth value in the tile data for the respective tile.

18. The method of claim 17, wherein for each tile, depth values between the minimum and maximum depth values of the low dynamic range depth buffer are scaled proportionally between the minimum and maximum depth values included in the tile data.

19. A system, comprising:

a remote computer, wherein the remote computer comprises a processor and a memory, the memory storing instructions which when executed on the processor implement the following:

receive a high dynamic range depth buffer;

decompose the high dynamic range depth buffer into a low dynamic range depth buffer and tile data, wherein decomposing the high dynamic range depth buffer comprises the remote computer being configured to:

segment the high dynamic range depth buffer into a plurality of tiles;

for each of the plurality of tiles, determine a respective maximum and minimum value of the high dynamic range depth buffer in a region greater than a width of the respective tile;

determine an initial pair of piecewise bilinear bounding functions for the high dynamic range depth buffer using the determined maximum and minimum values of the high dynamic range depth buffer in the region greater than the width of the respective tile;

for each tile, iteratively adjust the initial pair of piecewise bilinear bounding functions to move the respective minimum and maximum value of each tile closer to the high dynamic range depth buffer, wherein no adjacent tile is adjusted in the same iteration; and using the adjusted pair of piecewise bilinear bounding functions, generate a low dynamic range depth buffer and tile data;

compress, using a video encoder, the low dynamic range depth buffer;

compress, using a lossless compressor, the tile data; and transfer, over a data network, the compressed low dynamic range depth buffer and compressed tile data to a head-mounted device (HMD); and the HMD, wherein the HMD has a processor and a memory, the memory storing instructions which when executed on the processor of the HMD implement:

receive the compressed low dynamic depth buffer and the compressed tile data;

decode, using a video decoder, the compressed low dynamic range depth buffer and, using a decompressor, the compressed tile data; and reconstruct, using a piecewise bilinear interpolation function, a high dynamic range depth buffer from the decoded low dynamic range depth buffer and the decoded tile data.

20. The system of claim 19, wherein the HMD comprises a hardware sampling unit on a GPU which is configured to perform the piecewise bilinear interpolation function.

* * * * *